United States Patent [19]

Schnieder

[11] Patent Number: 4,738,775
[45] Date of Patent: Apr. 19, 1988

[54] PAPER EXTRACTOR FOR PLATE FILTER

[76] Inventor: John R. Schnieder, 26 Cove Rd., Belvedere, Calif. 94920

[21] Appl. No.: 907,376

[22] Filed: Sep. 15, 1986

[51] Int. Cl.$^4$ .............................................. B01D 25/12
[52] U.S. Cl. .................................... 210/225; 100/198; 210/227; 210/387
[58] Field of Search ................................ 100/196–199; 210/224, 225, 227, 228, 229, 230, 231, 359, 387, 400, 401

[56] References Cited

U.S. PATENT DOCUMENTS

| 3,608,734 | 9/1971 | Schneider | 210/387 |
| 4,289,615 | 9/1981 | Schnieder et al. | 210/387 |
| 4,292,173 | 9/1981 | Parmentier | 210/225 X |
| 4,362,617 | 12/1982 | Klepper | 210/225 |

Primary Examiner—Richard V. Fisher
Assistant Examiner—W. Gary Jones
Attorney, Agent, or Firm—Owen, Wickersham and Erickson

[57] ABSTRACT

A device for use in combination with a plate-type liquid filter apparatus for extracting sheets of filter media from between adjacent plates is disclosed. The device comprises a series of horizontal trays connected to a frame and adapted to support sheets of filter media extending from an adjacent multi-plate filter apparatus. A contact bar is provided for and extends transversely to each sheet. All contact bars are connected at their opposite ends to a pair of vertical drive bars which are attached to drive chains that move the drive bars in a generally rectangular path so that the contact bars are first moved downward in unison to make frictional contact with the media sheets, then forwardly to move the sheets along on their support trays, then upwardly out of contact and back to the starting point on each extraction cycle.

6 Claims, 3 Drawing Sheets

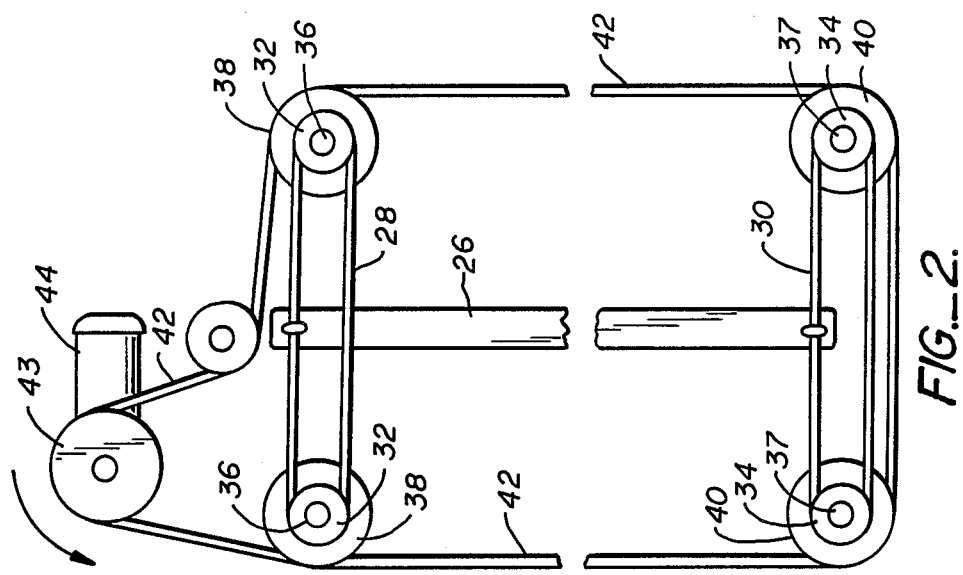
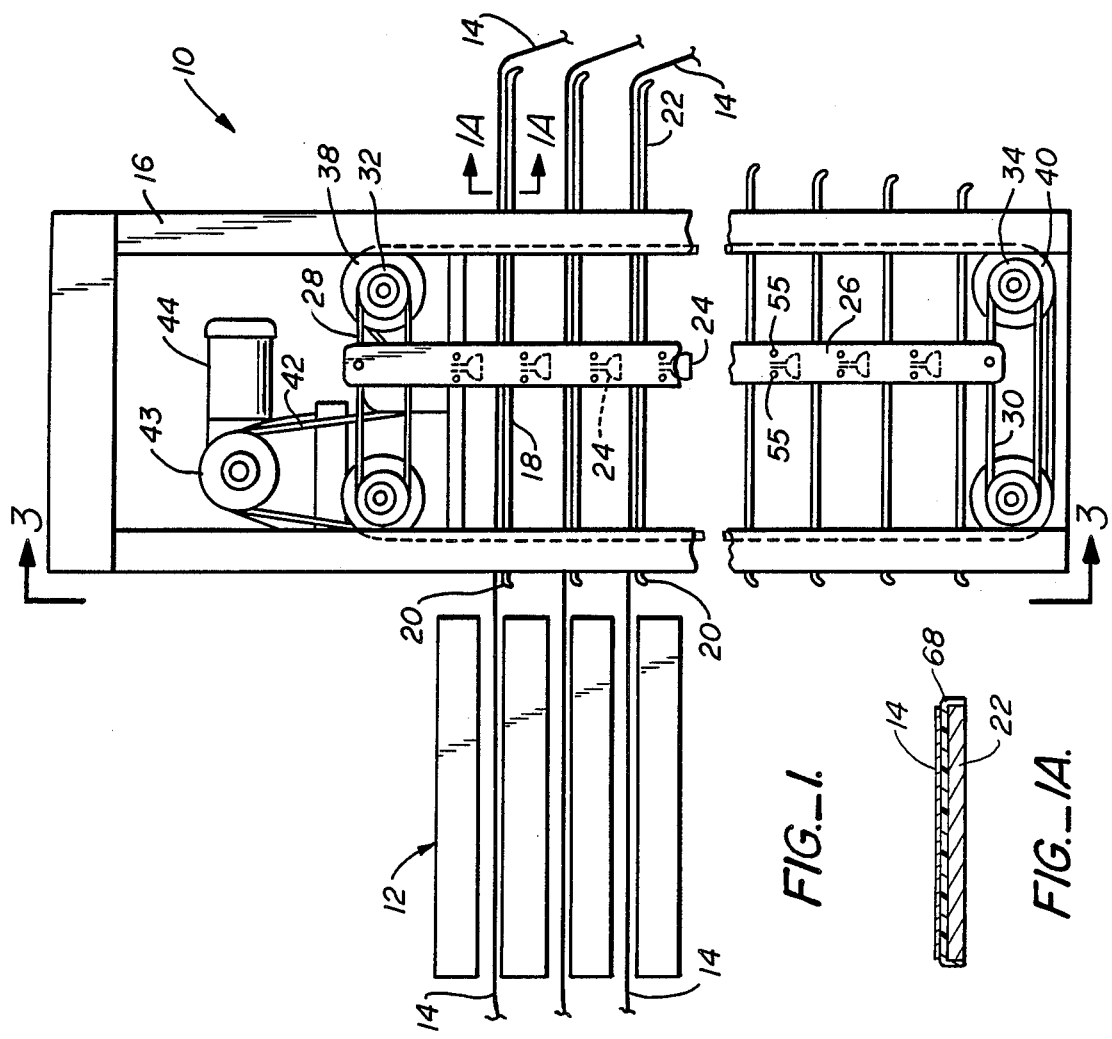

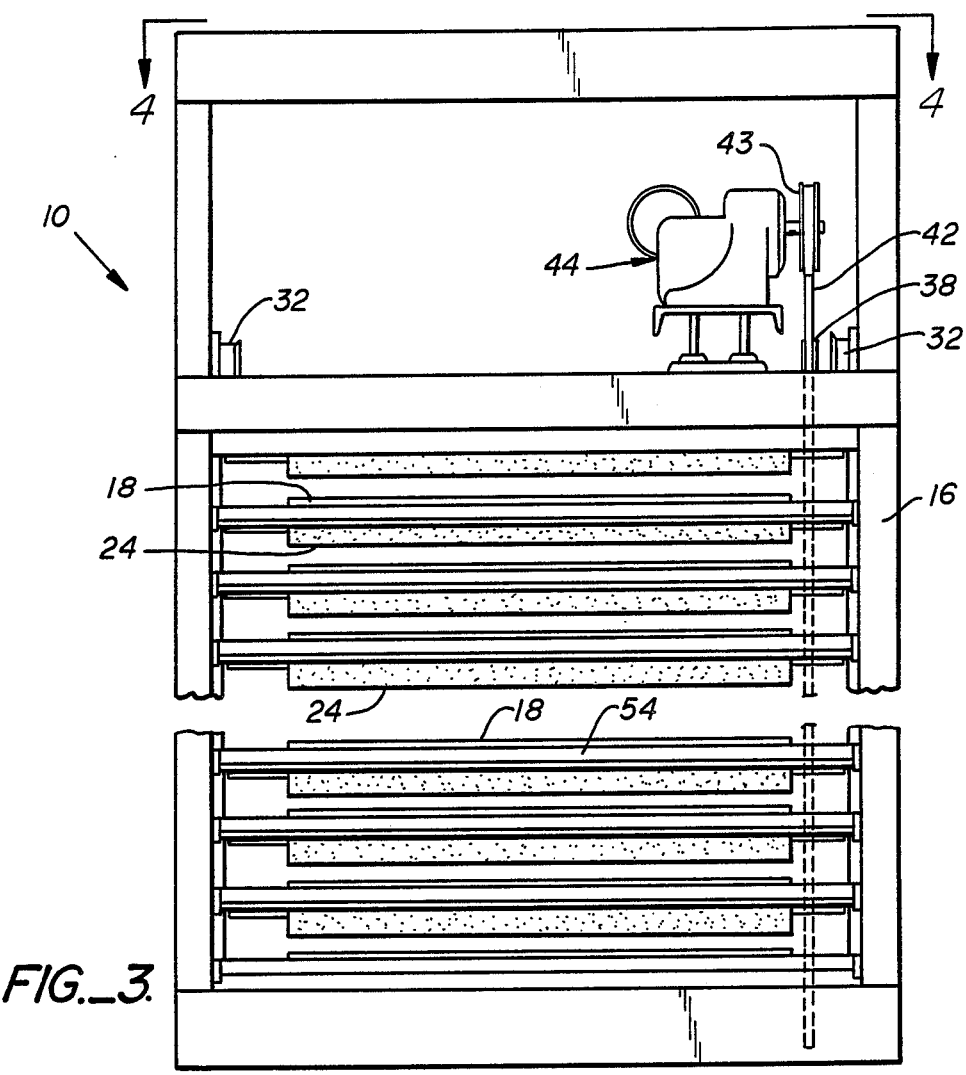
FIG._3.
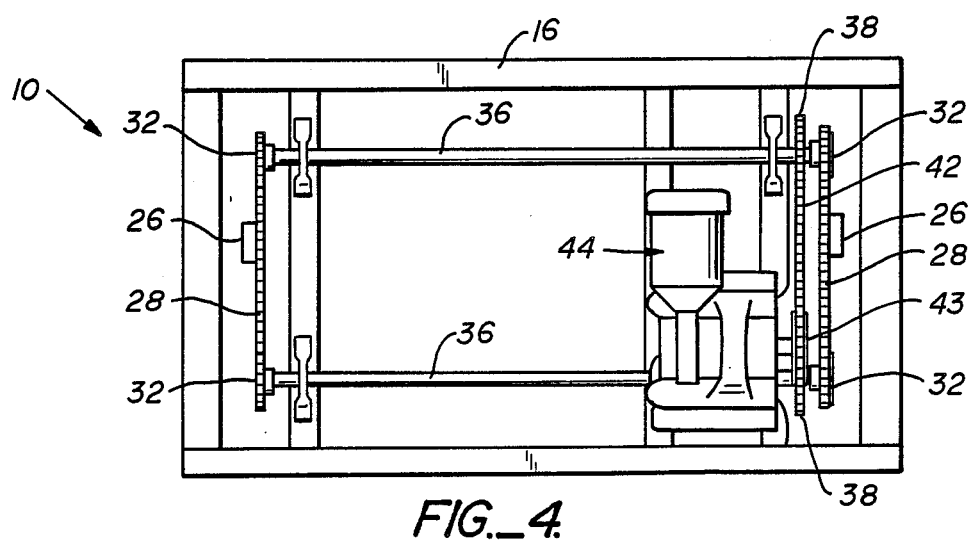
FIG._4.

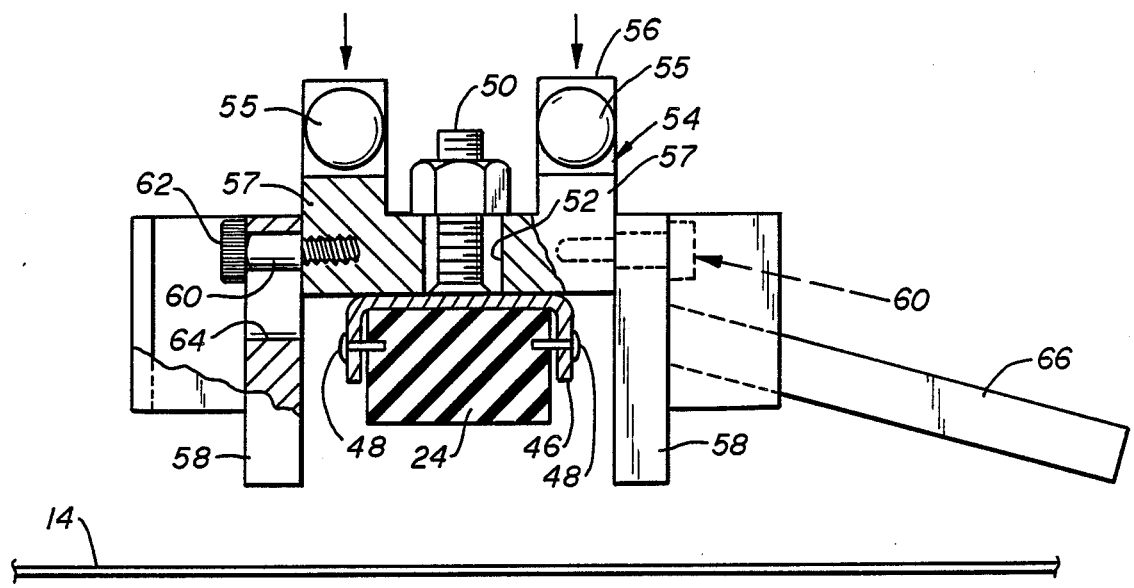
FIG._5.
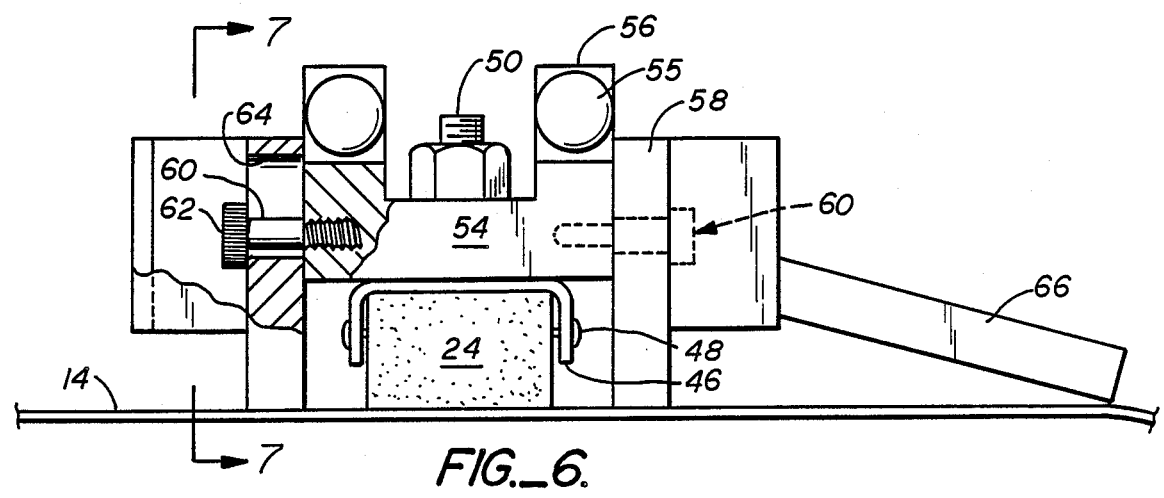
FIG._6.
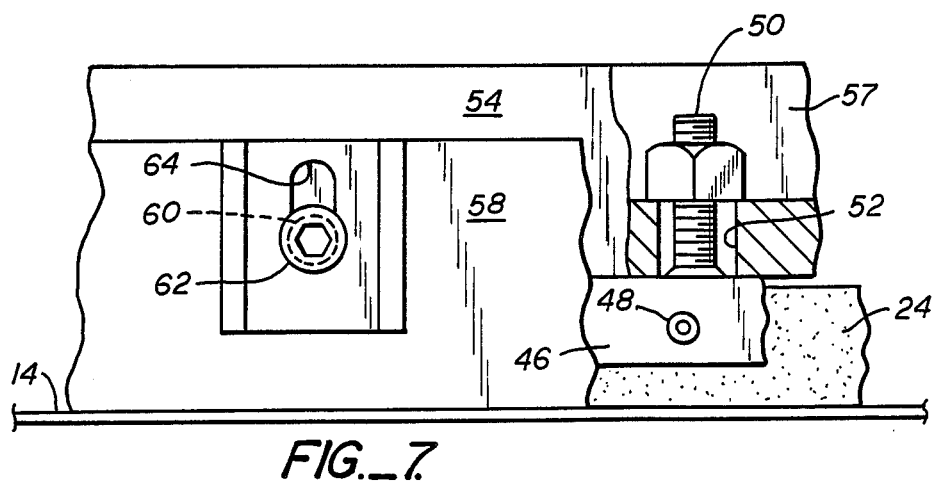
FIG._7

PAPER EXTRACTOR FOR PLATE FILTER

This invention relates to an improved device for simultaneously advancing multiple sheets of filter media used in a multi-plate filter apparatus.

BACKGROUND OF THE INVENTION

In plate-type industrial liquid filters, a plurality of plate elements are arranged in a horizontal stack and controlled for up and down movement by a jack mechanism. When the plates are pressed together, a sheet of filter media is provided between each pair of adjacent plates. A compartment for receiving dirty liquid is formed above each filter media sheet, and a compartment for trapping and removing clean liquid is provided below each sheet. When the plates are separated by the jack mechanism, the sheets of filter media with accumulated solids or cake are advanced in one direction so that the used media and the filter cake on each sheet can be removed, and new media can be put in place for the next filter cycle. Normally, the filter media is supplied in rolls located on one side of the stack of plates and a mechanism for moving or advancing the sheets of filter media is provided on the other side of the plate stack. In my U.S. Pat. No. 3,608,734, a plate-type filter utilizing a prior form of sheet media puller is described. This prior sheet media moving device utilized a multiplicity of sharp pins which were adapted to punch through the sheets of filter media in order to grip the sheets and move them forwardly. For each sheet, a series of pins connected to mounting bars were provided, and each mounting bar was attached to an endless chain that moved the bar downwardly, then forwardly, then upwardly and then back to a starting point for each advancing cycle. Although highly successful for many forms of sheet filter media, the aforesaid pin-type extractor was less effective for thinner forms of filter media which was necessary or more desirable for certain filtering operations. One inherent disadvantage with such prior extractors was that the pins necessarily pierced the filter media in use, thereby preventing its reuse which would otherwise be possible in some cases. Also, the pin-type extractor system heretofore devised was relatively expensive to manufacture since the pins themselves were machined and individually installed and the support plates for the filter were required to be slotted to accommodate the movable pins as they advanced the media. In some instances the pins became bent with use and caused maintenance problems.

A general object of the present invention is to provide an improved filter media extractor for plate-type filters that eliminates the need for pins that penetrate the media.

Another object of the present invention is to provide an improved filter media extractor for plate-type filters that moves each of a plurality of media sheets by providing a surface contact on each sheet that produces a friction factor sufficient to move the filter media forward.

Another object of the present invention to provide an improved filter media extractor for plate-type filters that is more economical to construct and easier to maintain.

Still another object of the invention is to provide a sheet media extractor for plate-type filters that operates effectively with a wide variety of sheet filter media including relatively thin and inexpensive paper media.

SUMMARY OF THE INVENTION

In accordance with the invention, an extractor mechanism is provided which in some respects is similar to the prior pin-type extractor described in my previously referred to U.S. patent. Thus, an extractor rack is provided having a plurality of horizontal and vertically spaced apart trays for supporting sheets of filter media that are drawn from between plates of a plate-type filter. For each tray and thus for each sheet of filter media supported on the tray, a transverse moving contact pad is provided which extends perpendicular to the direction of travel of the filter media as it is extracted from the filter. The moving contact pads for the various trays extend between and are attached to a pair of drive bars which are in turn connected to a pair of endless chains. When the chains are driven at a constant rate, the drive bars move all the media contact pads simultaneously and in a path that first moves the contact pads downwardly to engage the surface of the sheet media, then forwardly as each pad moves its contacted sheet across its supporting tray, then upwardly as it reaches the end of the tray, then back to the starting point. Thus, each sheet of filter media is moved forwardly and is extracted from between the plates of the adjacent filter with each cycle of the drive bars, but without any perforation or penetration of the sheet media.

Other objects advantages and features of the invention will become apparent from the following detailed description of one embodiment thereof, presented in conjunction with the accompanying drawing.

BRIEF DESCRIPTION OF THE DRAWING

FIG. 1 is a fragmentary view in side elevation of a filter media extraction device according to the present invention with an adjacent plate-type filter shown schematically.

FIG. 1A is a view in section taken along line 1A—1A of FIG. 1.

FIG. 2 is a diagrammatic view in elevation showing the chain-drive system for the extraction device of FIG. 1.

FIG. 3 is a fragmentary rear view in elevation of the extraction device of FIG. 1.

FIG. 4 is a top view of the extraction device of FIG. 1.

FIG. 5 is an enlarged view in section showing one contact bar of the extractor device according to the invention as it appears when located above a filter media support tray.

FIG. 6 is a view similar to FIG. 5 showing the contact bar of FIG. 5 as it appears when in contact with a sheet of filter media on its support tray.

FIG. 7 is a view in section taken along line 7—7 of FIG. 6.

DETAILED DESCRIPTION OF EMBODIMENT

With reference to the drawing, FIG. 1 shows a filter media extractor 10 embodying principles of the present invention as it appears adjacent to a plate-type filter 12. The filter is shown schematically with its plates separated so that used sheets of filter media 14 can be drawn from the filter by the extractor. The filter media is normally supplied from rolls (not shown) so that the used sheet media is replaced by clean media as it is advanced.

The extractor 10 comprises a frame 16 which supports a series of horizontal trays 18, one for each sheet of filter media. The inner end 20 of each tray is generally in the same horizontal plane as one filter plate from which a sheet of filter paper is extracted, and the outer end 22 of each tray on the opposite side of the frame extends out beyond it so the filter media can fall freely into a waste receptacle. To move the various sheets of filter media on their respective support trays, a series of movable contact pads 24 are provided. Each contact pad is movable to engage and press against the surface of a sheet of filter media at one end of a tray and, while in frictional engagement with the sheet, move it to the opposite end of the tray.

As shown in FIG. 1, the contact pads 24 for each support tray are connected at their ends to a pair of generally vertical drive bars 26. The drive bars are connected at their upper and lower ends to a pair of endless chains or belts 28 and 30. The upper chain 28 extends around a pair of sprockets 32 mounted on the frame and the lower chain 30 extends around a similar pair of sprockets 34. The sprockets 34 are each mounted on a shaft 36 to which is attached a larger sprocket 38. Similarly, the lower sprockets 34 are each mounted on a shaft 37 to which is attached a sprocket 40 having the same size as the sprockets 38. A master drive chain 42 extends around the sprockets 38 and 40 and around a drive sprocket 43 connected to a motor drive assembly 44. The latter is mounted on top of the extractor frame 16, as shown in FIGS. 3 and 4 and includes a gear reduction unit. Thus, as more readily seen in FIG. 2, movement of the drive chain by the motor causes equal rotation of the larger sprockets 38 and 40 and thus the smaller sprockets 32 and 34. Consequently, the chains 28 and 30 are driven to move the drive bars and thus the contact pads 24 in a continuously repeating generally rectangular pattern wherein the pads are moved vertically downward to engage their sheets of filter media 14, then forwardly to move the sheets along their support trays, then upwardly to disengage from the sheets of media and then backwardly to the starting point.

The construction and mounting details for the contact pads 24 are shown in FIGS. 5 and 6. Each pad is made of a yieldable, elastomeric material having a durometer of about 40–50 and is formed as an elongated block having a rectangular cross section. The pad is retained within a channel member 46 by suitable fasteners such as pop rivets 48 which extend through the side flanges of the channel into the pad at spaced apart intervals along its length. A series of studs 50 are welded to the web of each channel member 46 and extend upward from it at spaced apart locations. These studs extend through openings 52 in a pusher bar 54 for each pad which is connected at its opposite ends to the vertical drive bars 26 of the extractor 10 by a pair of spaced apart bolts 55 that extend through end flanges 56 on the pusher bar.

The pusher bar 54 has a U-shaped cross section and preferably provided with a pair of relatively thick side flanges 57. Slidably attached to the outer surface of each side flange is a stripper bar 58 which helps to keep the contact pad 24 from being clogged with filter cake and also assures that the sheet media engaged by each contact pad is removed therefrom as the contact pad reaches the end of its media advancing stroke and is moved upward.

To retain each stripper bar and provide its sliding capability, a series of pins 60 are attached (as by threads) to each bar flange 57 and have a head end portion 62 that extends outwardly. These head end portions are slidably retained within vertical slots 64 provided at intervals along each bar flange. (See FIG. 7). Thus, as the pusher bar 54 and its attached contact pad 24 is raised, the stripper bars 58 on each side moved downwardly by gravity to assume their position, as shown in FIG. 5. Conversely, when the contact pad 24 moves downwardly into engagement with the filter media to commence its forward horizontal movement or media advancing stroke, the stripper bars 58 ride upward on the pins 60 so that their lower edges are also at the surface of the filter media.

Attached to an outer surface of the front stripper bar 58 and extending forwardly and slightly downwardly therefrom at spaced apart locations are a series of media deflecting bars 66. These bars extend forwardly from each push bar and its contact pad to engage and push any sheet media ahead which might have a tendency to bulge upwardly as it leaves the support tray 22.

Upon the surface of each support tray 22 which is made of sheet metal, a surface layer 68 of a smooth plastic material, such as teflon is provided. This assures that the bottom surface of each sheet of filter media in contact with the tray surface will have a relatively low coefficient of friction that is substantially lower than the coefficient which the contact pad 24 has with the upper surface of the filter media. Thus, as previously described, when the extractor 10 moves each contact pad firmly against the upper surface of sheet of filter media and presses it against its support tray, the friction developed, by the contact pad will greatly exceed the friction of the sheet media on the tray surface. Therefore, as the contact moved forwardly, the filter media will slide easily across the tray without any stoppages or interruptions.

In operation during an extraction cycle, the motor drive assembly 44 drives the master chain 42 and thus the chains 28 and 30 so that the vertical drive bars 26 and thus the contact pads 24 are moved in a continuous, generally rectangular path. At the beginning of the cycle, the contact pads move downwardly to press each sheet filter media against its support tray 18 near its end 20 adjacent the filter. The contact pads, being forced against the filter media sheets create and maintain a frictional force that moves the sheets of media on the support trays as the contact pads move forward toward their other ends 22. As the contact pads reach the end of this media moving stroke, they are moved upward out of a contact with the sheets of media and then back again before commencing another extraction cycle.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. In combination with a liquid-filtering device comprising a plurality of plates for retaining elongated sheets of filter media between adjacent plates thereby forming a pair of fluid-tight chambers on opposite sides of each sheet, there being means defining an inlet to one chamber and means defining an outlet to the opposite chamber on the other side of the sheet and means for separating the plates when a filtering cycle is complete and the sheets of filter media are contaminated, a sheet extractor means adjacent the filtering device comprising:

a frame having a series of vertically spaced apart support trays for the sheets of filter media;

movable means for frictionally engaging but not penetrating the upper surface of each of said sheets of filter media that extend from between said filter plates when they are separated and for moving said sheets of filter media longitudinally on said support trays to remove the sheets from between the plates, said movable means including an elongated contact bar for each support tray which extends across said support tray generally transverse to the direction of sheet movement, and drive means for moving said bars in unison in a vertically downward direction at a starting location to engage substantially the full width of the sheets and thereby press them against their support trays, then forwardly to move the sheets on their support trays, then upwardly to retract from the sheets, and then rearwardly to the starting location.

2. The sheet extractor means as described in claim 1 wherein each said contact bar comprises an elongated block of elastomeric material.

3. The sheet extractor means as described in claim 2 wherein said elongated block of elastomeric material has a generally rectangular cross section.

4. The sheet extractor means as described in claim 2 wherein said elastomeric material has a durometer of about 40-50.

5. The sheet extractor means as described in claim 1 wherein each said contact bar is attached to a rigid mounting bar, and a movable stripper slidably attached to the front leading side of said mounting bar to prevent clogging of said contact bar.

6. The sheet extractor means as described in claim 1 including a layer of low friction material covering the upper surface of each said support tray and providing a coefficient of friction with said sheets of filter media which is less than the coefficient of friction of said contact bar with said sheets of filter media.

* * * * *